W. S. Carr,
Water-Closet Valve.
No. 973,
Patented June 12, 1860.
Reissued
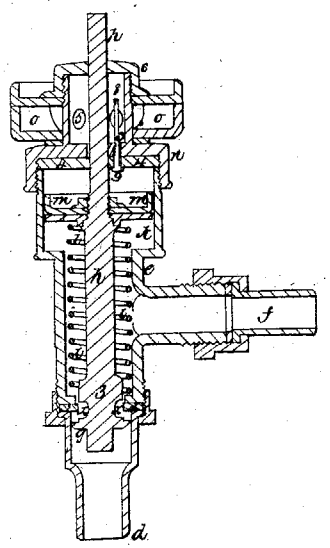
Fig 3
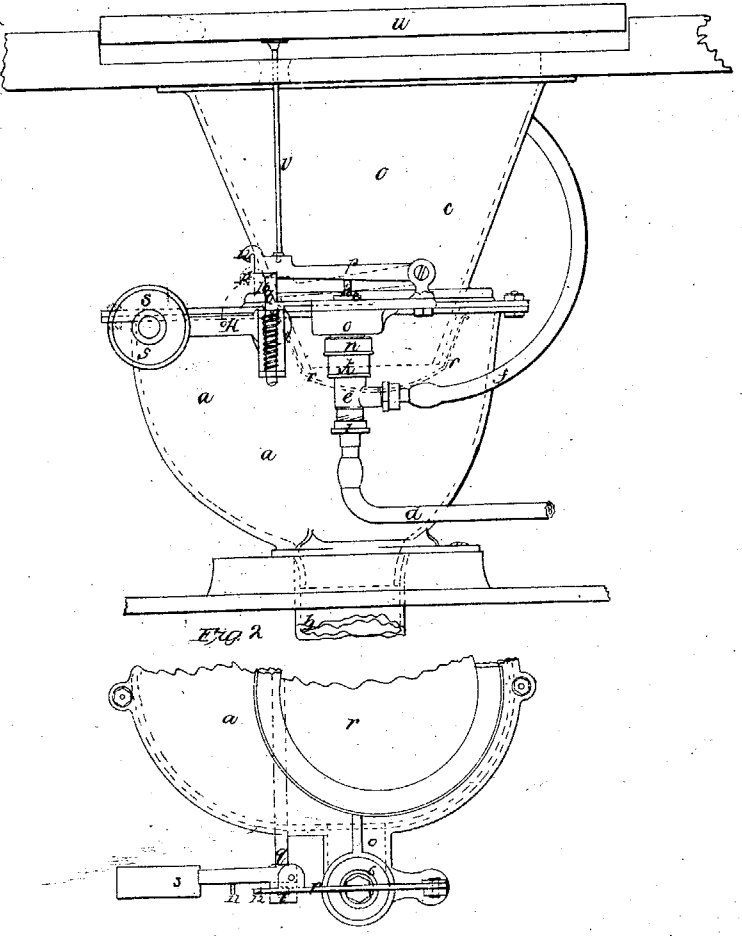
Fig 1
Fig 2
Witnesses:
Lewis H. Sewall
Chas. Geo. Harold
Inventor:
William S. Carr

UNITED STATES PATENT OFFICE.

WILLIAM S. CARR, OF NEW YORK, N. Y.

IMPROVEMENT IN WATER-CLOSETS.

Specification forming part of Letters Patent No. 15,474, dated August 5, 1856; Reissue No. 978, dated June 12, 1860

*To all whom it may concern:*

Be it known that I, WILLIAM S. CARR, of the city, county, and State of New York, have invented, made, and applied to use certain new and useful Improvements in Water-Closets; and I do hereby declare that the following is a full, clear, and exact description of the construction and operation of the same, reference being had to the annexed drawings, making part of this specification, wherein—

Figure 1 is an elevation of my closet as in place for use. Fig. 2 is a part of the cock and part of the pan of said closet, and Fig. 3 is a vertical section of my cock made use of in letting the water into and shutting the same off from said closet.

Similar marks of reference indicate the same parts in all the figures.

The nature of my said invention consists in a peculiar construction of cock, which is opened by the motion of the seat of the water-closet, and allows but little water to run into the pan of the closet until the weight is removed from the seat, when the cock, gradually closing of itself, allows the water to run for a limited and regulated time, sufficient to wash out the basin. I also make use of a peculiar arrangement of levers and latch in connection with said cock to throw and empty the pan of said water-closet; and I attach my cock directly to the closet, so that the same is always in its proper place and a separate connection to the floor is avoided, and I pass leakage from the cock directly into the trunk of the closet.

In the drawings, *a* is the trunk on the upper end of the soil-pipe *b*, fitted with the pan *r* on the shaft or spindle *q*, and *c* is the basin setting onto the trunk *a*. These parts thus far are to be of any usual or desired character.

*d* is a pipe supplying water from any suitable head, and said pipe is attached to the coupling 1, that screws onto the body *e* of the cock, and *f* is a pipe and coupling passing water (when admitted as hereafter detailed) to the basin *c*, where it is to be fitted with the deflector, as usual. The cock *e*, that supplies water to the basin, is constructed with a stem, *h*, passing nearly or quite air-tight through the leather washer 4 beneath the cap *n*, and the lower end of said stem *h* is formed with a valve, *g*, and with a cylindrical part, 3, fitting water-tight, or nearly so. The opening of the washer 2 between the coupling 1 of the pipe *d* and cock *e* and the sides of this cylinder 3 are formed with notches or a groove, *x*. It will now be seen that if the stem *h* be pressed down by the weight of the person acting on the seat *u*, rod *v*, and lever *p*, or by any other suitable means, the valve *g* will be forced away from the washer 2 and allow a dash of water to pass through the notch *x* sufficient to fill up the parts of the cock, and then that the cylinder 3, descending and filling the opening in the washer 2, will prevent, or nearly so, the passage of any more water into the closet. *i* is a spring around the stem *h*, which acts in aid of the pressure of the water on the valve *g*, to close the same so soon as the force which opened the said valve is removed; but if this alone were used the concussion would be so great as to tend to break the parts, besides which, sufficient water would not be supplied to the water-closet to cleanse the same. I therefore make use of the following means, which cause said valve *g* to close slowly and in a regulated amount of time, thereby allowing the desired quantity of water to dash past the washer 2 at the time the notches or openings *x* are moving past the same.

The upper part of the cock *e* is formed as a cylinder, *k*, in which is a disk, *l*, attached to the stem *h*, and a cup-leather, *m*, above the same. *n* is the cap of the cylinder *k*, which is formed with a short tube, 8, passing up through a hollow projection, *o*, from the side of the trunk *a*, and secured thereto by a nut, 6.

At the time valve *g* is pressed down, as before stated, the water dashes momentarily onto the cock and fills the same, passing the cup-leather *m* and filling the cylinder *k*, and upon the pressure on the stem *h* being removed the cup-leather expands by the slight rise of the stem, and would retain the valve *g* open were the cylinder *k* water-tight, and therefore the closing of said valve will be regulated according to the extent of leakage provided in said chamber *k*, and for this purpose the leakage at the washer 4 around the stem *h* may in some cases be sufficient; but I propose to use a screw, 9, entered through the cap *n*, with a head next the washer 4, and part of one side of the screw filed away, so as to adjust the amount of leakage and regulate the time during which the water will run into the closet.

In order to drop the pan *r* of the water-closet, I fit the same on the shaft or spindle *q* and provide the weight *s*, which is so adjusted as to be sufficient merely to replace the pan, when empty, beneath the basin in the usual manner, and I make use of a peculiar locking arrangement for retaining the pan in a horizontal position under the basin *c* or in an inclined position while being washed out, as shown in Figs. 1 and 2. The lever *p* is attached at one end at the fulcrum 7, and passes over the stem *h* and beneath the rod *v*, as before mentioned, and the end of this lever *p* is fitted so as to take onto a spring latch, *t*, placed vertically at the end of the spindle *q*, and is thrown upward by its spring when not otherwise acted on; and 12 is a hook on the end of the lever *p* to take a pin, 11, on the arm of the weight *s*. acting as hereinafter detailed.

The operation of the parts is as follows: The pan *r* we will suppose has been returned into its horizontal position, while empty, by the weight *s*. The latch *t*, in so doing, being forced down and then springing up into its notch at the end of the lever *p*, prevents the pan *r* from again assuming an inclined position in consequence of the water that runs into the same to exclude smell, and which is sufficient to overpower the weight *s* when the seat *u* is forced down by the weight of the person occupying the same. The lever *p* is also forced down by the rod *v*, and acts on the valve *g*, as before detailed, and its end forces down the spring-latch *t* also; but the pan *r* cannot be dropped by this motion, as the latch *t* still sustains the same, but in forcing down this latch *t* a beveled notch, 10, on the side thereof has been brought down to the slide through which said latch passes, and, the weight of water in the pan *r* tending to rotate the spindle *q*, the aforesaid beveled notch is pressed against the slide of the latch, and when the person rises from the seat, the tendency of the weight of water in the pan still being to press the latch against the vertical part of the notch in the lever and the beveled notch onto the slide of the latch, said latch is prevented from springing out, as the lever *p* rises, by the action of the water and spring *i*. Consequently said lever passes above the end of the latch *t* and the pan drops, emptying the same, and the latch, being now liberated, is projected by its spring. The pan *r* in dropping raises the weight *s* and pin 11; but the lever *p*, rising gradually, has not by this time attained sufficient elevation to allow the pin 11 to take the end of the lever *p* without lifting the same by passing under the inclined end, and then the lever *p* drops again and its hook 12 takes said pin 11, and holds the pan *r* in its inclined position until the further closing of the valve *g* and raising of the lever *p* disengages said pin and the weight *s* returns the pan *r* to place, where it is retained by the latch *b* and filled by the further flow of water as the cock finally closes, and the closet is again ready for use. I am thus enabled to obtain a reliable and self-acting water-closet, and one that does not waste water while being used, but simply supplies sufficient to cleanse the basin after the user rises from the seat. In cases where this cock is placed below the ground to avoid frost, the water in the pipe *f* will gradually waste past the cup-leather *m*; but if this be not sufficiently fast in its operation a small hole may be inserted in the cylinder *e*.

I am very well aware that cocks have heretofore been fitted in such a manner as to avoid any sudden motion in either opening or closing, therefore I lay no claim to so doing; but I am not aware of any valve having been fitted with a groove or notched cylinder, 3, as herein set forth, whereby the water is allowed to pass the seat slightly on being forced down, and then the cylinder closes said seat almost or quite water-tight, irrespective of the weight on the seat which may vary the position of said cylinder, whereas in all other water-closet cocks that I am acquainted with the flow of water has been shut off by a valve closing onto a seat, hence the weight might not be sufficient to compress a valve tightly to its seat; and the pressure being removed from my said valve it gradually closes, allowing the water to run for a limited time, and then the said valve finally closes in the same direction as the flow of water, which also aids in making said valve tighter.

I am also aware that a given amount of water-leakage has been used to prevent a sudden motion in cocks, balances, meters, and a variety of other instruments, therefore I do not claim the same; but I am not aware that a cup-leather has ever before been so fitted and applied with a valve as to allow the water to pass the said cup-leather freely in the chamber in which it moves, and then act when the power is relieved from the valve upon the water in said chamber and gradually allow the valve to close. Neither am I aware of any previous instance in which the valve or cock for supplying water has been connected directly to the pan or hopper so that a separate connection to the floor is avoided and the closet, cock, and parts to move said cock are maintained in the correct relative position, and I am also enabled to convey leakage from said cock to the closet-hopper in consequence of the cock being thus attached directly to the hopper.

What I claim as my invention, and desire to secure by Letters Patent, is—

1. A cylindrical plunger or plug, 3, substantially as specified, acting to close the water-passage, 2, at the time the water closet seat is depressed, irrespective of the weight on the seat, as distinguished from a valve which requires compression to a given point before closing, as set forth.

2. The valve *g*, cylinder 3, and openings *x*, in combination with the seat 2, and acting in the manner and for the purposes set forth.

3. In a valve for water-closets, a cup-leather for controlling the motion of said valve in closing gradually, substantially as specified, said cup-leather moving freely in one direction and closing against the containing-cylinder in the other direction, and the leakage of water in said cylinder allowing the movement of said cup-leather, as set forth.

4. The lever *p*, acted on by the seat and simultaneously controlling the movements of the pan *r* and valve or cock for admitting water, as specified.

5. The combination of the lever *p*, latch *t*, and valve spindle *g h*, as described, for regulating the movements of the pan *r*, as set forth.

6. The valve for admitting water to the closet, in combination with the trunk or hopper, when said valve is connected directly to the said hopper, for the purposes and as set forth.

7. In a water-closet in which the cock is attached to the hopper, a hollow arm, *o*, or opening into said hopper, substantially as specified, for conveying leakage from said cock into the hopper, as set forth.

In witness whereof I have hereunto set my signature this 11th day of February, 1860.

WILLIAM S. CARR.

Witnesses:

LEMUEL W. SERRELL.

THOS. GEO. HAROLD.